(12) United States Patent
Sargent

(10) Patent No.: US 6,286,851 B1
(45) Date of Patent: *Sep. 11, 2001

(54) DOUBLING-ACTING REDUCED TONGUE WEIGHT TRAILER HITCH

(76) Inventor: Frank T. Sargent, 5433 Brandy Cir., Fort Myers, FL (US) 33919

( * ) Notice: Subject to any disclaimer, the term of this patent is extended or adjusted under 35 U.S.C. 154(b) by 0 days.

This patent is subject to a terminal disclaimer.

(21) Appl. No.: 09/444,483

(22) Filed: Nov. 19, 1999

Related U.S. Application Data

(63) Continuation of application No. 09/109,740, filed on Jul. 2, 1998, now Pat. No. 6,142,500.
(60) Provisional application No. 60/109,285, filed on Nov. 20, 1998.

(51) Int. Cl.$^7$ ........................................... B60D 1/01
(52) U.S. Cl. ........................................ 280/455.1; 280/477
(58) Field of Search ..................... 280/448, 455.1, 280/477, 405.1, 446.1, 462, 511

(56) References Cited

U.S. PATENT DOCUMENTS

| | | | |
|---|---|---|---|
| 2,680,626 | * 6/1954 | Hedgpeth | 280/406.2 |
| 2,772,893 | * 12/1956 | Wettstein | 280/406.2 |
| 3,633,939 | * 1/1972 | Evernham | 280/455.1 |
| 3,756,618 | * 9/1973 | Lewis | 280/455.1 |
| 3,814,463 | * 6/1974 | Tunesi | 280/455.1 |
| 4,106,170 | * 8/1978 | Schoeneweis | 29/157.1 |
| 4,306,734 | * 12/1981 | Swanson et al. | 280/455.1 |
| 4,312,516 | * 1/1982 | Olsen | 280/455.1 |
| 5,226,657 | * 7/1993 | Dolphin | 280/498 |
| 5,240,273 | * 8/1993 | Stead et al. | 280/489 |
| 5,725,231 | * 3/1998 | Buie | 280/455.1 |
| 5,868,414 | * 2/1999 | McCoy et al. | 280/455.1 |
| 5,910,217 | * 6/1999 | Sargent | 280/455.1 |
| 6,142,500 | * 11/2000 | Sargent | 280/455.1 |

FOREIGN PATENT DOCUMENTS

| | | | |
|---|---|---|---|
| 1911906 | * 9/1970 | (DE) | 280/455.1 |
| 2721914 | * 11/1977 | (DE) | 280/455.1 |

* cited by examiner

Primary Examiner—Daniel G. DePumpo
(74) Attorney, Agent, or Firm—William E. Noonan

(57) ABSTRACT

A double-acting, reduced tongue weight trailer hitch includes a drawbar assembly and a hitchhead assembly. The drawbar assembly is releasably connected to the tow vehicle and includes a first coupling component at its rearward end. The hitchhead assembly includes a second coupling component and a drawbar extension pivotally connected to the second coupling component along a vertical axis. The drawbar extension is pivotally interconnected to the hitch ball along a first horizontal axis that is transverse to the direction of travel. A rearward portion of the drawbar extension is pivotally interconnected to the trailer along a second horizontal axis, which is parallel to the first horizontal axis and located behind the hitch ball. This creates an overlap between the forward end of the trailer and the drawbar extension. A spring assembly dampens upward and downward movement of the trailer relative to the drawbar extension. The coupled tow vehicle and trailer operate essentially as a unified beam and resist relative hinging movement and resulting instability while driving along the highway. The spring also allows the tow vehicle and trailer to stably negotiate dips and bumps in the roadway at relatively low speeds.

16 Claims, 12 Drawing Sheets

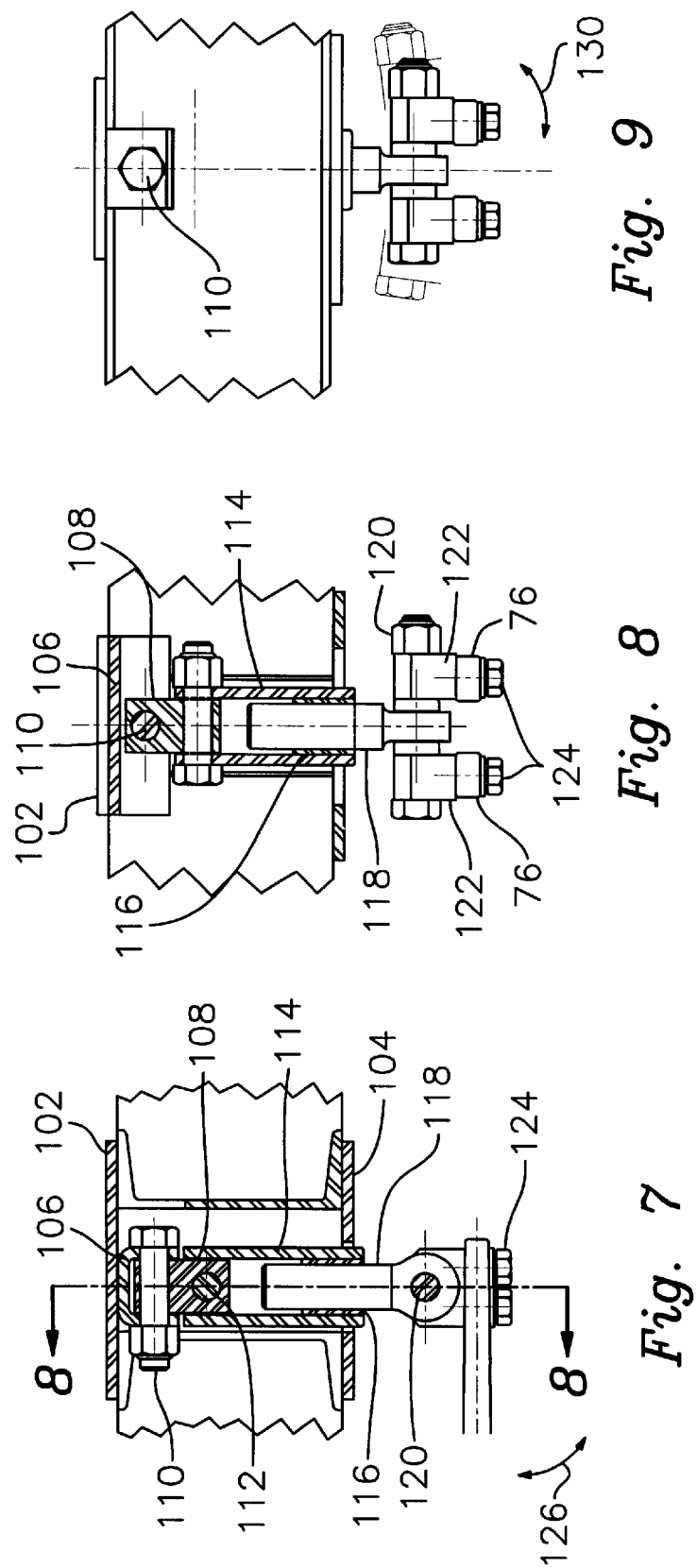

DOUBLING-ACTING REDUCED TONGUE WEIGHT TRAILER HITCH

RELATED APPLICATIONS

This application is a continuation in part of U.S. application Ser. No. 09/109,740 filed Jul. 2, 1998 now U.S. Pat. No. 6,142,500. This application also claims the benefit and priority of copending Provisional Application No. 60/109,285 filed Nov. 20, 1998.

FIELD OF THE INVENTION

This invention relates to a double-acting trailer hitch that requires significantly less tongue weight than previously known trailer hitches.

BACKGROUND OF THE INVENTION

During the 1920s and 1930s, trailer hitches began incorporating a hitch ball attached to an extension of the tow vehicle and a ball coupler carried by the forward end of the trailer. The coupler was engaged with the ball so that the tow vehicle could pull the trailer along the highway.

A number of developments, including improved highways, more powerful automobiles and trucks, and the advent of electromagnetic trailer brakes allowed the vehicles and attached trailer to achieve greatly increased highway speeds. These developments also permitted much heavier trailers to be towed. The traditional ball hitch was eventually found to be unacceptable for handling such increased speeds and trailer weights. In particular, the rig tended to be very unstable. The most significant source of instability was the upward hinging or toggle that occurred between the tow vehicle and the trailer at the point of the coupling ball. This was especially noticeable during braking. At such times, a portion of the linear momentum of the tow vehicle is converted to angular momentum. This causes the front of the tow vehicle to dip downwardly and the rear of the vehicle to pitch upwardly. In the case of the original ball hitch, the delay in activation of the trailer's electromagnetic brakes caused the significant weight of the trailer to push against the trailer ball. This tended to push the rear of the tow vehicle upwardly with even greater force. The height of the ball at the top of the hinge point effectively formed a toggle with the axles of the tow vehicle and trailer. Accordingly, the linear motion of the trailer was also converted into upward force on the ball. The toggle effect was exacerbated when the rig encountered bumps or dips on the highway. All of this made the traditional ball coupling highly unstable and contributed to serious highway accidents.

To counteract the instabilities of the original ball hitch, the weight-distributing hitch was introduced during the 1950s. Initially, the upward hinging exhibited between the tow vehicle and trailer was addressed by adding weight to the tongue of the trailer proximate the ball. It was determined that "a tongue weight" of approximately 10 to 15 percent of the gross trailer weight was generally adequate to prevent excessive upward hinging about the trailer ball. However, simply adding tongue weight was and still is, by itself, an inadequate remedy. This weight must be effectively distributed among the axles of the tow vehicle and the trailer so that the rear of the tow vehicle does not sag and a level, stable ride is maintained. Weight distributing trailer hitches that perform this function have been available for many years.

Notwithstanding their current widespread use, conventional weight distributing hitches still exhibit a number of disadvantages. The forces that these hitches generate to counteract the heavy tongue weight of the trailer tend to exert significant stress on the suspension of the tow vehicle. As a result, trucks, sport utility vehicles and full frame automobiles normally must be used as the tow vehicle. Smaller automobiles without a full frame are generally inadequate to support the force produced by the weight-distributing hitch. Such smaller vehicles normally cannot be used to pull a large trailer.

Moreover, the heavy tongue weights exhibited in present weight distributing hitches can create serious instabilities when the rig is driven at highway speeds. In particular, during a sudden lane change, which may result when the driver takes evasive action, the tongue weight carried by the overhang of the trailer behind the rear axle of the tow vehicle often creates a large X-axis moment transverse to the direction of travel. This moment can cause the tow vehicle and trailer to jackknife or flip. Serious accidents often result from such instability.

Conventional weight distributing trailer hitches also normally require that the trailer axles be positioned fairly close together and spaced apart a significant distance from the trailer tongue. This is needed in order to provide the trailer with the necessary tongue weight. When the trailer axles are positioned close together, optimal trailer stability may not be exhibited.

One known trailer hitch designed for use with relatively lightweight frameless automobiles employs a dolly that is mounted beneath the hitch. The dolly travels along the roadway with the rig and supports the tongue weight without distributing the weight to the tow vehicle. This apparatus is unduly complicated and introduces additional wheels that must engage the highway. A failure of the dolly wheels will render the entire rig inoperable.

SUMMARY OF INVENTION

It is therefore an object of the present invention to provide a trailer hitch that requires the use of a significantly reduced tongue weight.

It is a further object of this invention to provide a trailer hitch, which joins the frame of the tow vehicle and the frame of the trailer such that they are effectively joined as a single piece along an axis extending in the direction of travel.

It is a further object of this invention to provide a trailer hitch that minimizes hinging and toggle action between the tow vehicle frame and the trailer frame so that significantly improved and more stable towing is achieved.

It is a further object of this invention to provide a trailer hitch that permits the tongue weight to be significantly reduced so that less stress is placed on the springs and suspension of the tow vehicle.

It is a further object of this invention to provide a trailer hitch that greatly reduces the dangerous instability and risk of jackknifing often accompanying evasive maneuvers and sudden lane changes.

It is a further object of this invention to provide a trailer hitch, which exhibits extremely stable operation, but without requiring the use of a heavy tongue weight.

It is a further object of this invention to provide a trailer hitch that eliminates the transverse moment and resulting instability caused when a tow vehicle and trailer swerve on the highway.

It is a further object of this invention to provide a trailer hitch apparatus that reduces the tongue weight of the trailer so that additional accessories and/or equipment can be mounted to the forward end of the trailer.

This invention results from a realization that the normally high tongue weights used in weight-distributing trailer hitches may be significantly reduced by employing preloaded, double-acting spring means for dampening the relative movement between the tow vehicles and the trailer about a horizontal (X) axis transverse to the direction of travel. This invention results from the further realization that tongue weight may be reduced by pivotably overlapping the drawbar extension of the tow car hitch to the trailer to a point rearwardly of the hitch ball. This enables the tow vehicle and trailer to act essentially as a unified beam, which is controlled by a preloaded spring so that hinging and toggling are minimized when the rig is driven at highway speeds. Conversely, hinging is allowed to occur between the tow vehicle and trailer when bumps and dips are encountered at low speeds.

This invention features a double-acting, reduced tongue weight trailer hitch for interconnecting a trailer to a tow vehicle. The hitch includes a drawbar assembly that is selectively attached to the tow vehicle. A first coupling component is attached to a rearward end of the drawbar. A hitchhead assembly includes a ball element that is releasably attached to a clevis and suspended by from a ball coupling supported by the trailer. A drawbar extension is pivotally connected to the ball element by a pivot that is axially transverse to the direction of travel. A second coupling component is pivotally connected to the drawbar extension along a generally vertical axis. The second coupling component includes means for interengaging complementary means in the first coupling component such that the first and second coupling components are coupled and the drawbar is held at a predetermined axial angle relative to the ground. There are means for interconnecting a rearward portion of the drawbar extension to the trailer. Such means for interconnecting include a horizontal pivot that is substantially parallel to the horizontal axis. At least one of the drawbar extension and the means for interconnecting includes spring means for dampening movement of said drawbar extension relative to the trailer. While the tow vehicle and trailer travel in a straight line on a relatively level highway, the spring means resist pivoting of the drawbar extension and the tow vehicle and frame move forwardly as a single unified structure. When the tow vehicle engages bumps and dips in the roadway, the spring means permits the drawbar extension to temporarily pivot relative to the trailer, until the undulation is crossed. The spring then returns the drawbar extension to its original condition.

In a preferred embodiment, the first coupling component is fixedly interconnected to the drawbar. The first and second coupling components may be include components that prevent hinging or pivoting movement between the first and second coupling components. For example, the first coupling component may include upper and lower hitchpin holes that are interengaged by respective hitchpins. The second coupling component may include a horn featuring an upper slot or recess and a lower hitchpin hole. The horn may also include a ramp that is connected to the upper slot. An upper hitchpin is inserted through the upper hole of the first coupling component and the drawbar assembly is directed against the horn such that the upper hitchpin rides up the horn and drops into the slot of the second coupling component. The height of the trailer is then adjusted, typically by a jack, so that the lower hole of the first coupling component is aligned with the lower hole of the horn. A lower hitchpin is inserted through the aligned holes to fixedly interconnect the first and second coupling components.

The second coupling component may include means for adjusting the height of the second coupling component. Such means may include a vertical channel element that is slidably interengagable with the horn. Means may be provided for interlocking the horn in the channel element at a selected height. This height adjustment allows the user to fine-tune the hitch to accommodate differing tow vehicle heights. Additionally, the drawbar assembly may be constructed so that the first coupling component is disposed at an angle to the drawbar. As a result, the drawbar assembly may be inverted to position the first coupling component at differing heights relative to the hitchhead assembly. The drawbar assembly is selectively inverted, depending upon the height of the tow vehicle, so that the first coupling component is held at a height that conveniently interengages the second coupling component carried by the hitchhead.

The drawbar extension may include a yoke that is pivotally interconnected to the second coupling component by a vertical pin. The yoke is typically mounted to the ball by means of a clevis that is suspended from the ball and a horizontal pivot pin that interconnects the yoke and the clevis. In certain embodiments, the drawbar extension may include an elongate bar that is attached to the yoke and extends rearwardly therefrom. The spring means may include a stack of generally juxtaposed disk spring elements arranged in an alternating pattern. Each such spring may be biased in a direction opposite to that of the immediately adjacent spring. Each disk spring may have an annular shape and the spring dampening means may further include an elongate central element about which the spring elements are disposed and a housing that contains the spring elements. The housing is typically mounted to the trailer frame. Annular spacer elements may be disposed about the central element and between each pair of adjacent spring elements. The spring stack may be adjustably preloaded to dampen pivoting of the drawbar extension about the horizontal axis by a selected amount. The spring assembly may include a depending connector link that is slidably mounted within the housing and resiliently engages the spring components. The depending connector link is pivotally interconnected to a distal location on the drawbar extension bar.

In an alternative preferred embodiment, the drawbar extension comprises a pair of longitudinally resilient spring bars that are releasably interconnected to the yoke. The distal end of each spring bar is pivotally suspended from a support post that is attached to the trailer frame. The support post is mounted to the frame such that it is capable of pivoting slightly about a first horizontal axis extending in the direction of travel and a second horizontal axis that is generally perpendicular to the first horizontal axis. The support post is also torsionally rotatable about a vertical axis. Movement of the support post allows the means for interconnecting to compensate for movement of the trailer hitch during operation of the tow vehicle and trailer. The spring bars are preloaded analogously to the disk springs so that the bars and the remainder of the hitchhead assembly resist pivoting about the horizontal axis, particularly during highway travel along a level surface. In each embodiment, the spring means minimizes the hinging motion or toggle effect normally exhibited between the trailer and the tow vehicle and thereby reduces the need for using heavy tongue weights to counteract this effect.

BRIEF DESCRIPTION OF THE DRAWINGS

Other objects, features and advantages will occur from the following description of preferred embodiments and the accompanying drawings, in which:

FIG. 7 is an elevational, partly cross sectional view of the rearward end of a respective one of the spring bars and the means for interconnecting the bars with the trailer frame;

FIG. 8 is a cross sectional view taken along line 8—8 of FIG. 7;

FIG. 9 is an elevational rear view of the means for interconnecting the spring bars to the trailer frame;

DETAILED DESCRIPTION OF PREFERRED EMBODIMENTS

Figure 1:
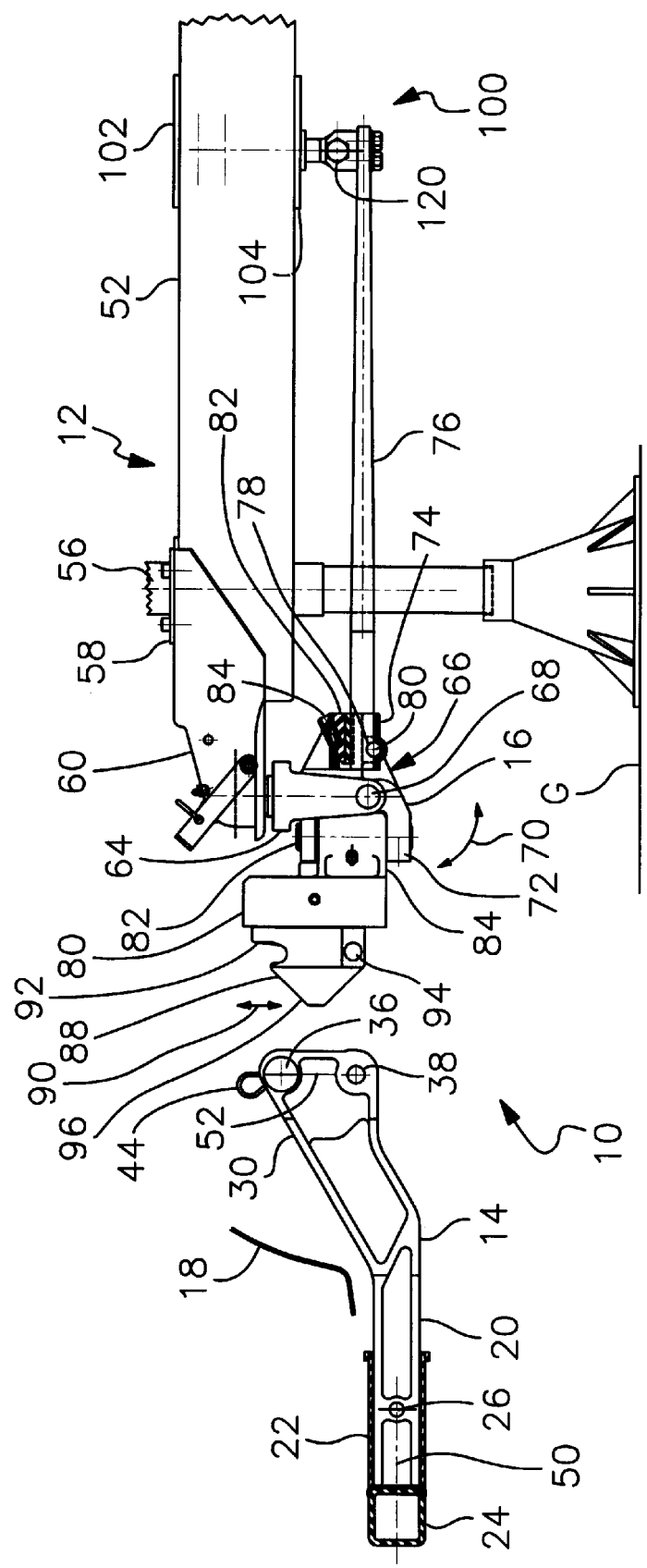
FIG. 1 is an elevational side view of a preferred trailer hitch of this invention with the hitchhead assembly suspended from the front end of a trailer and the drawbar assembly interconnected to a tow vehicle; the hitchhead assembly and the drawbar assembly are depicted prior to coupling in accordance with this invention.

There is shown in FIG. 1 a preferred double-acting, reduced tongue weight hitch apparatus 10. It should be understood that a number of the components featured in the hitch of this invention are analogous and constructed similarly to corresponding features disclosed in pending U.S. application Ser. Nos. 09/109,740, filed Jul. 2, 1998, and U.S. Pat. No. 5,951,036. The descriptions contained in those specifications are incorporated herein by reference. Components described herein may also be constructed in the manner shown for analogous components in those referenced specifications.

In particular, hitch 10 is designed for attaching an A-frame trailer 12 to a tow vehicle, not specifically shown. Hitch 10 is suited for use in connection with various types of trailers, as well as all types and sizes of tow vehicles. Neither the type of tow vehicle nor the type of trailer should be construed as a limitation of this invention. It should also be understood that the axles and wheels of both the trailer and the tow vehicle are not depicted. These are standard components that do not comprise a part of the invention. Their relative positioning and operation should be understood to those skilled in the art. Nonetheless, through the use of the invention disclosed herein, the axles of the trailer may be spaced further apart than in conventional trailers. This is possible because of the significantly reduced tongue weight required by this trailer hitch. Repositioning the forward trailer axle closer to the tongue reduces the leverage of the tongue and thereby the tongue weight. This shall become more evident from the following description.

Figure 2:
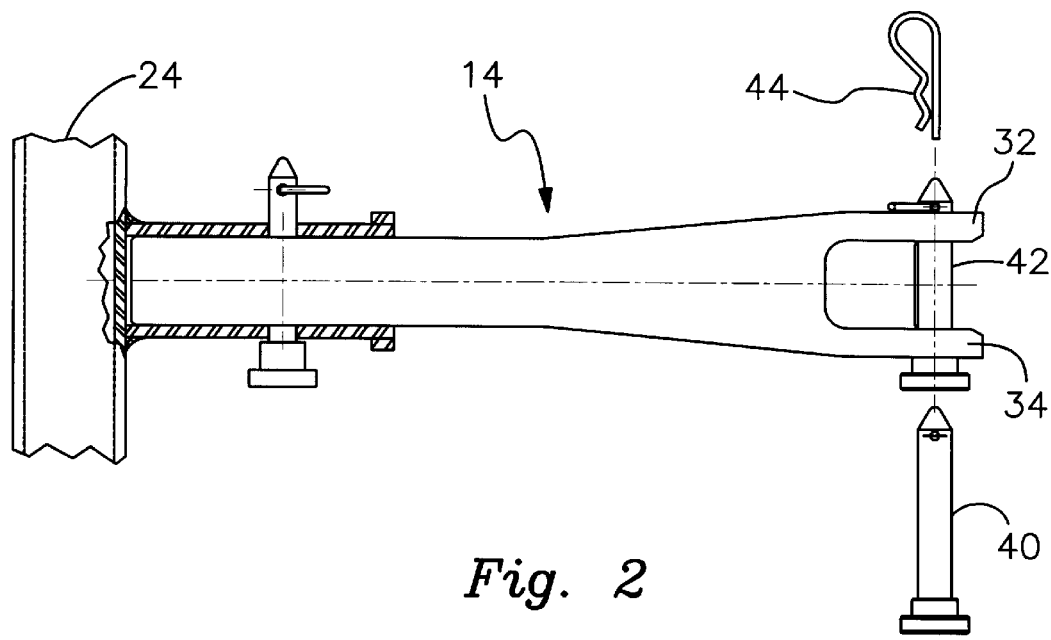
FIG. 2 is a top, partly cross sectional view of the drawbar assembly.

Hitch apparatus 10 includes a forward drawbar assembly 14 and a rearward hitchhead assembly 16. The hitchhead assembly is attached to and suspended from trailer 12 in a manner described in the above-referenced applications and further described below. The drawbar assembly, which is shown alone in FIG. 2 is disposed beneath vehicle bumper 18 and includes an elongate drawbar, 20 which preferably has a square cross sectional shape. Bar 20 is selectively inserted in a complementary shaped receiver tube 22. The receiver tube is secured to and extends from a transverse mounting bar 24. This bar extends between and is attached to the longitudinal frame components of the tow vehicle. In tow vehicles not employing a frame, the transverse bar can be attached to various other structural components of the tow vehicle. Bar 20 is secured to tube 22 by a transverse pin 26. A first coupling component 30 is permanently and preferably unitarily fixed to drawbar 20. Component 30 comprises a shank that extends angularly from drawbar 20 and has a pair of spaced apart flanges 32 and 34, best shown in FIG. 2. These flanges include a pair of aligned upper holes 36 (FIG. 1) and a pair of aligned lower holes 38. Each pair of aligned holes receives a respective hitchpin 40 and 42 shown in FIG. 2. The operation of the coupling component and its hitchpins is described more fully below. Each pin is held within its respective pair of aligned holes by a spring clip 44. The axis 50 of drawbar 20 is perpendicular to the line 52 interconnecting the centers of holes 36 and 38. In alternative embodiments, a pivotably adjustable first coupling component may be used as shown in my copending application Ser. No. 09/109,740.

Figure 3:
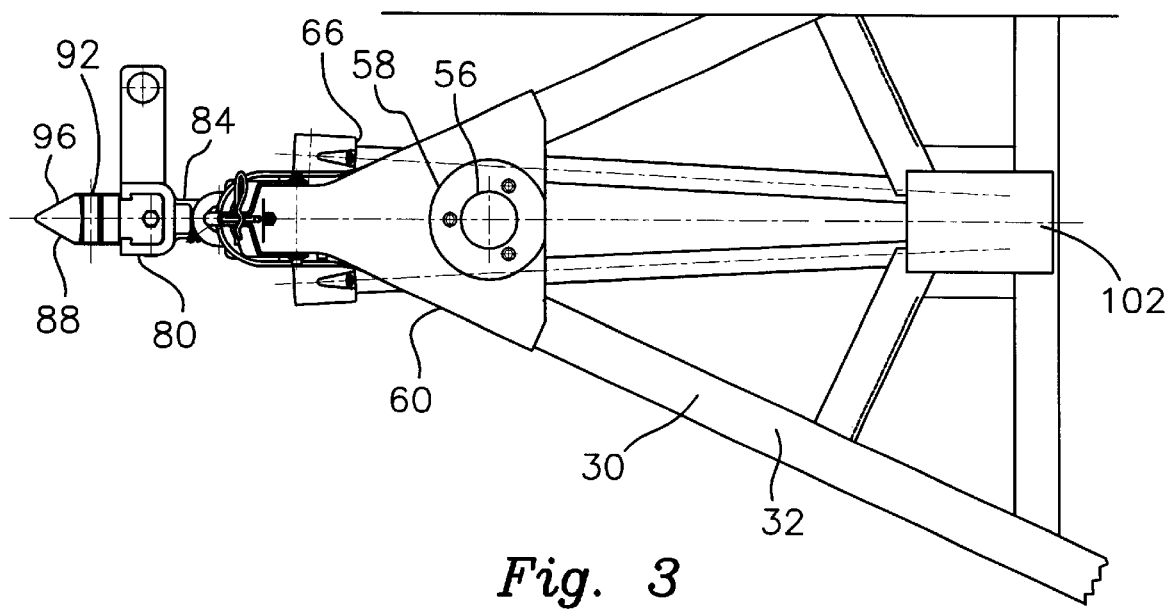
FIG. 3 is a top plan view of the front end of the trailer's A-frame and the attached hitchhead assembly.

As shown in FIGS. 1 and 3, the front end of trailer 12 has a generally A-shaped frame 52 comprising a pair of elongate frame elements 54 that converge at the forward end of the trailer. A standard trailer jack 56 extends upwardly from ground G through a coupling plate 58 carried by ball coupler 60 at the forward end of frame 52.

Figure 5:
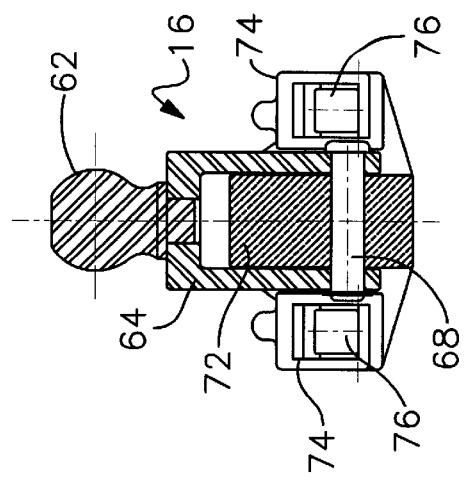
FIG. 5 is a cross sectional view taken along line 5—5 of FIG. 4.
Figure 4:
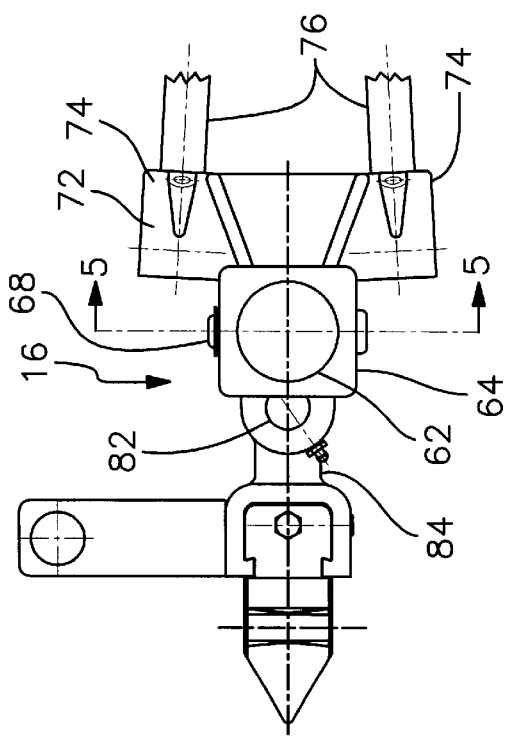
FIG. 4 is a top plan view of the hitchhead assembly and the forward end of the spring bars.
Figure 6:
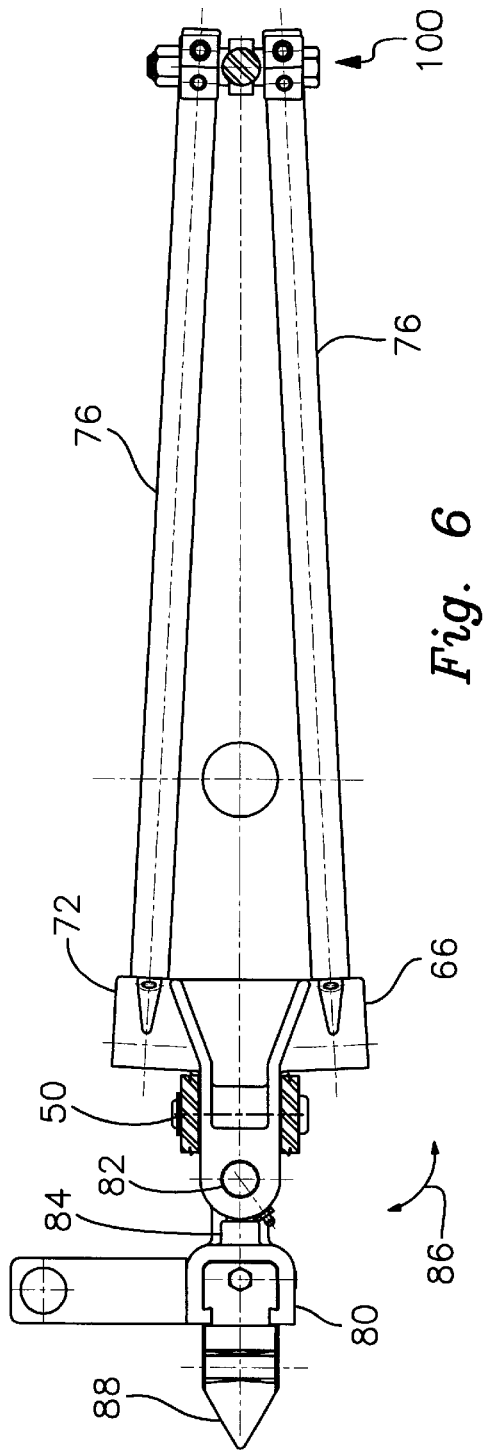
FIG. 6 is a top plan view of the hitchhead assembly and the drawbar extension that extends rearwardly therefrom.

Hitchhead assembly 16, also shown in FIGS. 4 and 5, includes a ball element 62 that is threadably secured to a clevis 64. Alternatively, the ball may be welded or otherwise secured to the clevis. The ball element comprises the Y-axis coupling about which the rig rotates when one of the wheels strike a curb, for example. Ball 62 is mounted in and suspended from ball coupler 60 in a conventional manner and, more particularly, in the manner shown in the above-referenced applications. The Y-axis is in the line of travel. A drawbar extension 66, FIGS. 1 and 3 through 6, is secured to clevis 64 by a horizontal pivot or bolt 68. This pivot permits the drawbar extension to pivot or rotate about a horizontal axis that is generally transverse to the direction of travel. As a result, the drawbar extension is permitted to pivot relative to the hitch ball in the manner indicated by doubleheaded arrow 70 in FIG. 1.

Drawbar extension 66 includes a yoke 72 that carries a pair of spring bar receptacles 74. Each receptacle 74 receives the forward end of a respective elongate spring bar 76, which comprises a part of the drawbar extension. Spring bars 76 may have various known strengths and resiliencies within the scope of this invention. As best shown in FIG. 1, the forward end of the spring bar includes a notch 78 that engages a rounded pin 80 extending through the receptacle. A tapered wedge element 82 is likewise received in the receptacle. An adjustment screw 84 is selectively tightened or loosened within the receptacle. When the adjustment screw is tightened, the tapered wedge element 82 is forced into the receptacle to hold the forward end of the spring bar tightly in place. When the screw is loosened, the tapered element may be removed so that the spring bar can likewise be removed from the receptacle. Various other structures may be used for releasably mounting the forward end of each spring bar in a respective one of the receptacles 74.

A channel member 80, FIGS. 1, 3, 4 and 6, is pivotally interconnected to drawbar extension 66 by a generally vertical pin of shaft 82. More particularly, channel 80 is attached to an integral mounting segment 84 that is received between the upper and lower ears of yoke 72. See the analogous construction disclosed in U.S. application Ser. No. 09/109,740. As a result, channel member 80 is pivotal about a Z-axis relative to drawbar extension 66 in the manner indicated by doubleheaded arrow 86 in FIG. 6. The pin 82 effectively forms a Z-axis coupling.

A horn 88 is adjustably mounted within channel 80 in the manner described in the previously referenced applications. As a result, horn 88 may be adjusted vertically within channel 80 as indicated by double headed arrow 90 in FIG. 1. Horn 80 includes an upper recess or slot 92 and a lower hitchpin hole 94. An incline or ramp 96 extends from the forward end of the horn to a point adjacent recess 92. The channel member and its adjustably attached horn comprise a second coupling component that is interengaged with the first coupling component in a manner described more fully below.

The distal end of each spring bar 76 is interconnected to trailer frame 52 by a suspension component 100. That component is shown best in FIGS. 1 and 6 through 9. In particular, a pair of upper and lower plates 102 and 104, respectively, are mounted to the trailer frame as best shown in FIGS. 7 through 9. A bracket 106 is welded or otherwise attached to upper plate 102. A mounting block 108 is fit within the bracket and Y-axis pivot 110 (which preferably comprises a bolt) is mounted rotatably through block 108. An X-axis pivot 112 is likewise mounted through a lower portion of the block. A square tube 114 is engaged with the lower end of block 110 and a threaded sleeve 116 is carried by the lower end of the square tube. A threaded support post 118 is interengaged with sleeve 116. The lower end of support post 118 carries a horizontal (X-axis) pivot 120. A pair mounting blocks 122 are pivotally interengaged with pivot 120 on respective sides of support post 118. Each block 122 is connected to a distal end of a respective spring bar 76 by a respective pair of screws 124.

The above construction permits each spring bar to rotate about horizontal pivot 120, as indicated by doubleheaded arrow 126 in FIG. 7, when the tow vehicle and hitch encounter bumps and dips in the road. Additionally, the support post is permitted to pivot about the X, Y and Z-axes. In particular, as best shown in FIG. 8, there is a small gap between block 108 and the surface of bracket 106. This permits the support post and the spring bar 76 to pivot in the manner indicated by double headed arrow 130 in FIG. 9. This pivoting occurs about the Y-axis. Such movement typically occurs when a tow vehicle and trailer encounter uneven ground such as a curb or ditch along the side of the road, which causes the rig to tilt about the Y-axis. Analogously, there is a slight gap between the tube 114, FIG. 7, and the edges of lower plate 104. This permits the support post to rotate about pivot 112 when undulations are encountered in the roadway. Finally, the entire support post is pivotable axially a slight amount within sleeve 116. This again allows the support component to compensate for uneven highway surfaces. As a result, the rearward end of the spring bars can move slightly during rotation of the tow vehicle about various axes so that the components of the support are not overly stressed.

Figure 10:
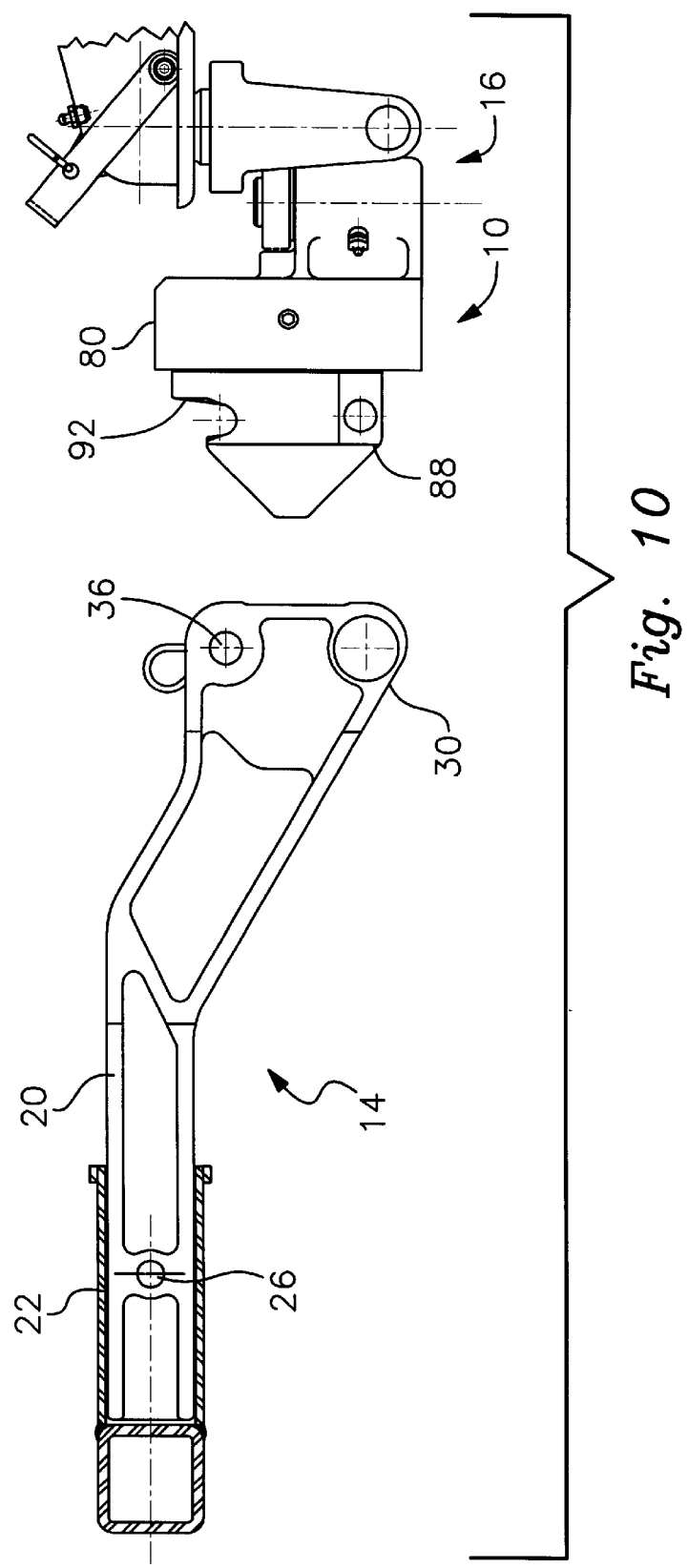
FIG. 10 is an elevational side view of the drawbar assembly and the hitchhead assembly with the drawbar assembly in an inverted position such as when it is used for tow vehicles having a higher receiver tube.

Hitch apparatus 10 is installed in the following manner. Initially, drawbar 20 is inserted into receiver tube 22. The trailer is then leveled with respect to the ground using conventional leveling means. Next, the installer selects the orientation of the drawbar. This will depend upon the height of the tow vehicle. Normally, the receiver tube is mounted to the tow vehicle such that its axis is positioned anywhere from 10 to 17 inches above the ground. For low heights (e.g. 10 to 13.5 inches) the drawbar assembly is oriented in the manner shown in FIG. 1. Coupling component 30 is angled upwardly and positioned proximate hitchhead assembly 16. Alternatively, in cases where a larger tow vehicle and a higher positioned receiver tube are used, the drawbar assembly 14 is inverted in the manner shown in FIG. 10 so that the coupling component 30 is angled downwardly to meet the hitchhead assembly 16. It should be noted that in most cases the hitchhead assembly is positioned such that there is a distance of approximately 17 to 19 inches from the ground to the center of the ball. After the drawbar assembly is orientated properly, the bar 20 is inserted into receiver tube 22 and the pin 26 is connected to secure the drawbar assembly to the tow vehicle. The user then installs an upper hitchpin 40 through aligned holes 36 and secures that hitchpin in place with an appropriate hitchpin clip 44.

The ball coupler and hitchhead assembly 16 are installed in a manner similar to that described in the previously referenced applications. The installation of this hitchhead assembly is even simpler, however, because the angle of the hitchhead assembly does not have to be adjusted in any way. This distal ends of spring bar 76 are interconnected to respective blocks 122 by screws 124. The forward end of each spring bar is then inserted into its respective receptacle 74 and locked in place in the above-described manner. The spring tension of bars 76 is selected to preload the hitchhead assembly a desired amount so that movement of the drawbar extension is dampened during operation of the rig.

Next, horn 88 is vertically adjusted within channel 80 so that the center of recess 92 is approximately equal to the height of the center of upper holes 36 in coupling component 30. The horn is then locked in place in the manner described in the above-referenced applications. In some cases, the horn may be tack welded so that it is permanently fixed in the channel. At this point, the hitch installer's task is normally completed. In some cases, a skilled laymen or homeowner may be able to undertake the above-described installation procedures.

Figure 11:
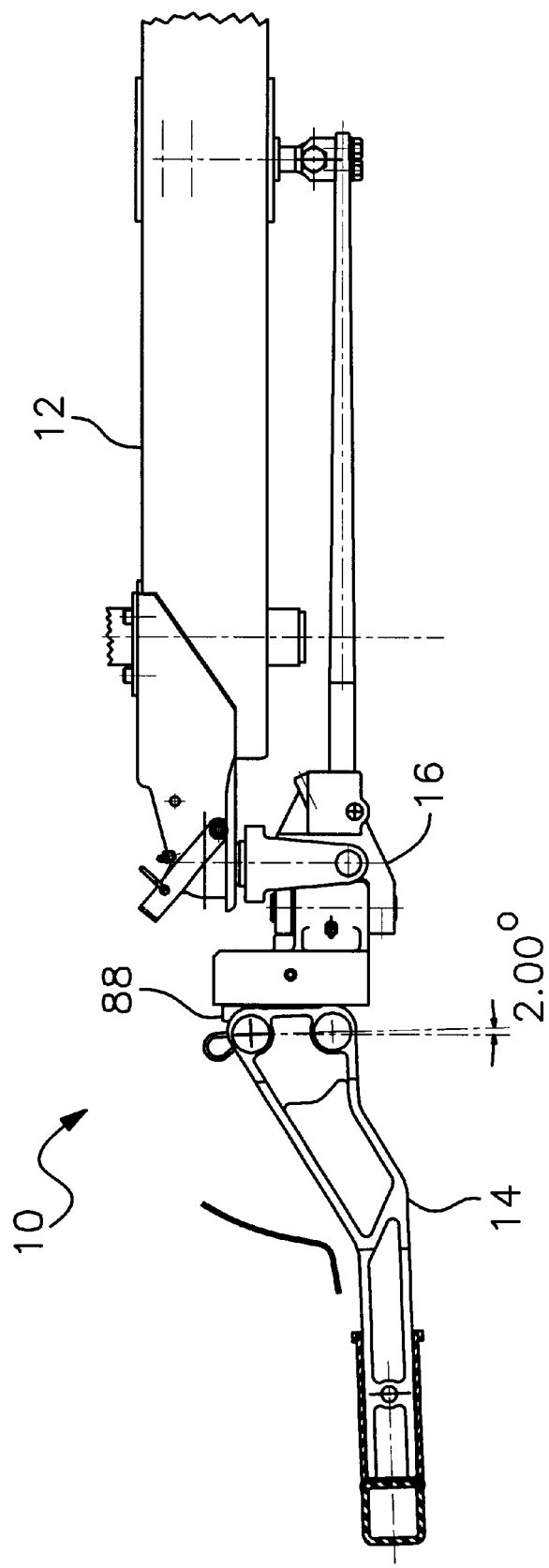
FIG. 11 is an elevational side view of the hitch of FIGS. 1 through 9 in a fully assembled condition.
Figure 12:
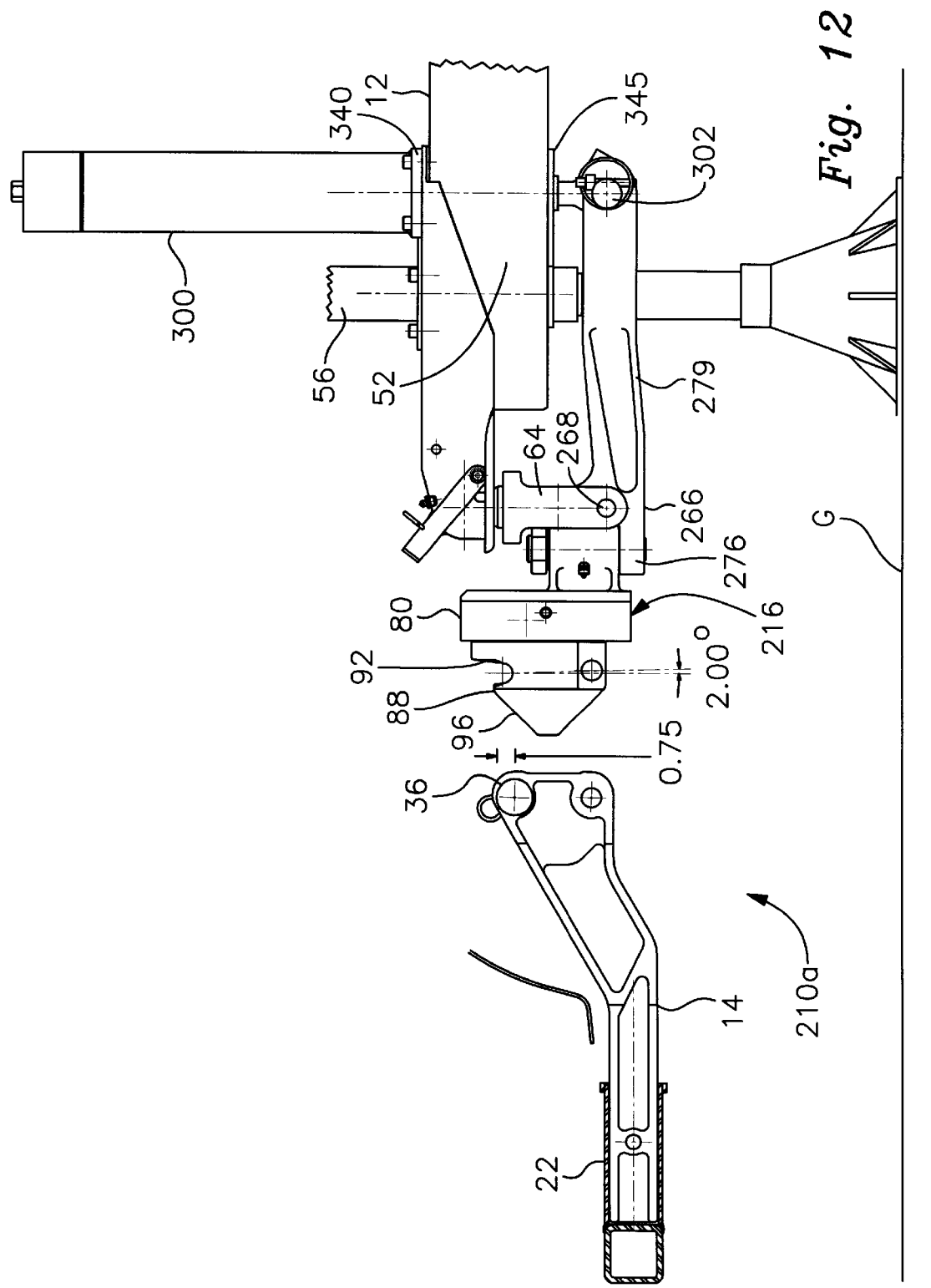
FIG. 12 is an elevational side view of an alternative hitch in accordance with this invention; the hitch is depicted prior to coupling of the tow vehicle and the trailer.

To complete installation and coupling of the tow vehicle and trailer, the user operates jack 56, FIG. 1, so that the center of recess 92 is positioned approximately 0.75 inches above the center of holes 36. The apparatus is then coupled by simply driving the tow vehicle rearwardly toward the trailer. The upper hitchpin 40 interengages ramp 96 and rides up the ramp until it drops into horn recess 92. At this point, lower holes 38 of component 30 and lower hole 94 of horn 88 are separated by an angle of approximately 2°. This amount is determined because the center if the lower horn hole 94 is disposed approximately 2° rearwardly (i.e. toward the trailer) of the center of recess 92. The user then raises jack 56 until holes 38 and 94 are aligned. A lower hitchpin 42, FIG. 2, is then inserted through the aligned lower holes and coupling is completed. The jack is then used to lower the trailer and removed. At this point, the apparatus is attached to and is fully coupled as illustrated in FIG. 11. Due to the offset construction between the upper recess and the lower hole of horn 88, the drawbar of assembly 14 is tilted 2°. This imparts the necessary torsion to the tow bar assembly. It has been determined that 2° provides more than sufficient weight distribution because of the reduced amount of tongue weight needed by this apparatus.

The installation procedure for hitch 10 is much simpler than the installation in my referenced patent applications. This is primarily due to the simpler construction that is employed. Angles of the drawbar and hitchhead assemblies do not have to be adjusted.

In operation, the tow vehicle is driven, drawbar extension 66, pulls trailer 12 at a point located behind ball 61. There is no need to use a heavy tongue weight. The spring bars 76 resiliently and effectively counteract the normally destabilizing moments created when the tow vehicle and trailer brake or encounter bumps or dips in the road. Specifically, the spring bars restrict the linear momentum of the tow vehicle from being converted into angular momentum. The rear end of the tow vehicle, therefore, resists being lifted upwardly. If a bump or dip is struck, the spring bars pivot (about pivots 68 and 120) and flex to permit the requisite hinging between the tow vehicles and trailer. The bars then quickly return the vehicles to an aligned condition when the obstruction is passed. Conversely, as the rig travels along the level road at highway speeds (i.e. above 30 miles per hour) the spring bar bias virtually eliminates any pivoting of the bars about either of the horizontal pivots 68 or 120. Hinging is further minimized because the forward end of the trailer overhangs the drawbar extension 66, which is pivotally attached to the trailer behind the hitch ball. As a result, the tow vehicle and the trailer operate essentially as a unified beam while traveling along the highway. There is virtually no hinging or toggle effect exhibited between the tow vehicle and the trailer. Because of this, the heavy tongue weight that is normally used to counteract the hinging effect may be reduced significantly. The forward axle of the trailer may be moved forwardly along the trailer, which increases the stability of the trailer. At the same time, the resulting tongue weight is reduced substantially.

Reducing the tongue weight yields several important advantages. Less stress is exerted on the suspension and springs of the tow vehicle. Additionally, the transverse moment that is otherwise generated when the rig swerves, such as during lane changes or when taking evasive action, is significantly reduced. The risk of jackknifing and flipping is therefore minimized. Moreover, reducing the tongue weight enables additional items, such as propane tanks and tools, to be stored proximate the tongue. The precise reduction in tongue weight that is possible through the use of the invention may vary. However, the spring bars are typically selected to reduce hinging sufficiently so that the tongue weight may be reduced to a level not exceeding 1.5 times the average weight per foot of the trailer. Ideally, the tongue weight that is required is between ½ and 1 ½ times the average weight per foot. This means that the tongue weight should ideally be approximately 120 to 300 pounds. One half of that weight is transmitted to the tow vehicle. Accordingly, through the use of this hitch there are, only 60 to 180 pounds of tongue weight acting on the tow vehicle. This is less than the average weight per foot of virtually all trailers. This is a negligible force, which should have virtually no effect on the tow vehicle or its suspension. Such a low force also permits the hitch of this invention to be utilized on vehicles that do not have a frame. The dolly required in the prior art is eliminated.

An alternative hitch 210 in accordance with this invention is shown in FIGS. 12 through 15. This version employs a drawbar assembly 14 that is identical to the assembly previously described. Hitchhead assembly 216 likewise comprises a horn 88 and a channel member 80 that are identical to the previously described components. The principal difference in this embodiment is the use of a drawbar extension 266 mounted by clevis 64 to the hitch ball. Drawbar extension 266 includes a yoke 272 that is pivotally mounted to channel member 80 in the above-described manner. A relatively rigid bar 279 is unitarily connected to the yoke and extends rearwardly therefrom. Bar 279 is connected to clevis by a pin 268 having a horizontal axis of rotation that is transverse to the direction of travel. Bar 279 is interconnected proximate its rearward end to the trailer frame 52 by a spring stack assembly 300. More particularly, the drawbar extension is pivotally connected to a connecting rod of the spring stack assembly by a pin that defines an X-axis pivot or coupling 302. An analogous spring stack assembly and drawbar extension are fully disclosed and described in pending U.S. application Ser. No. 09/109,740. The spring stack assembly serves to dampen rotation at drawbar extension 266 about both pivot 268 and rearward pivot 302. The spring stack is preloaded to resist virtually any hinging between the tow vehicle and the trailer during braking, slowing or normal highway driving.

Spring assembly 300 is depicted in detail in FIGS. 16–19. As shown therein, this assembly comprises a generally tubular outer housing 301. Spring assembly 300 is welded by means of a lower plate 345, FIG. 12, to trailer frame 30. A bracket 340 is bolted to coupler 36 such that the spring assembly extends centrally through the A-frame of the trailer. Bracket 340 resists stresses placed on plate 345 and prevents rocking of housing 301. Plate 345 is welded between housing 301 and trailer frame 30 at the bottom of the frame.

Figures 16, 17:
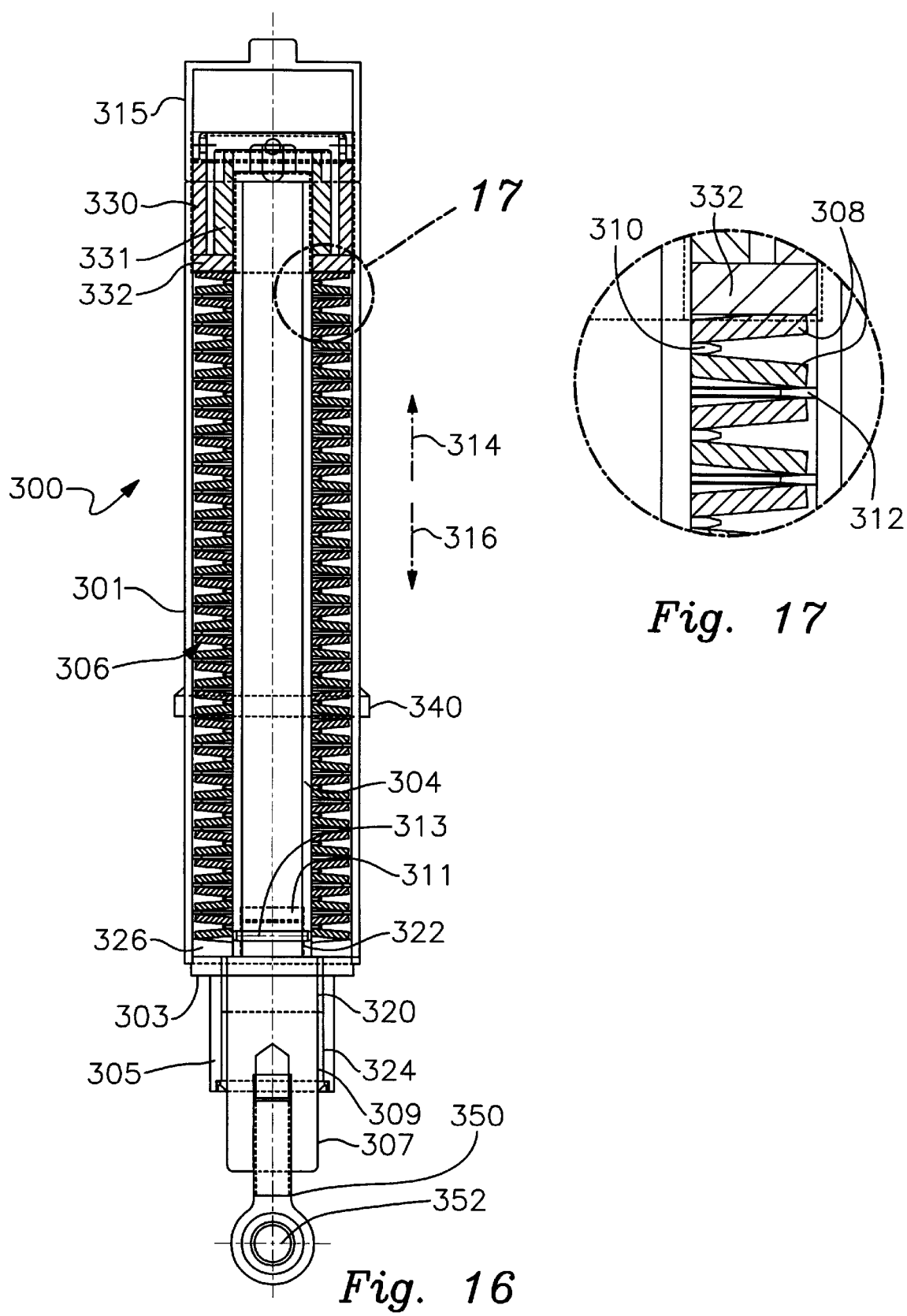
FIG. 16 is an elevational, cross sectional view of the pre-loaded dual action spring assembly of this invention.
FIG. 17 is an elevational, cross sectional view of the upper end of the spring assembly.
Figure 18:
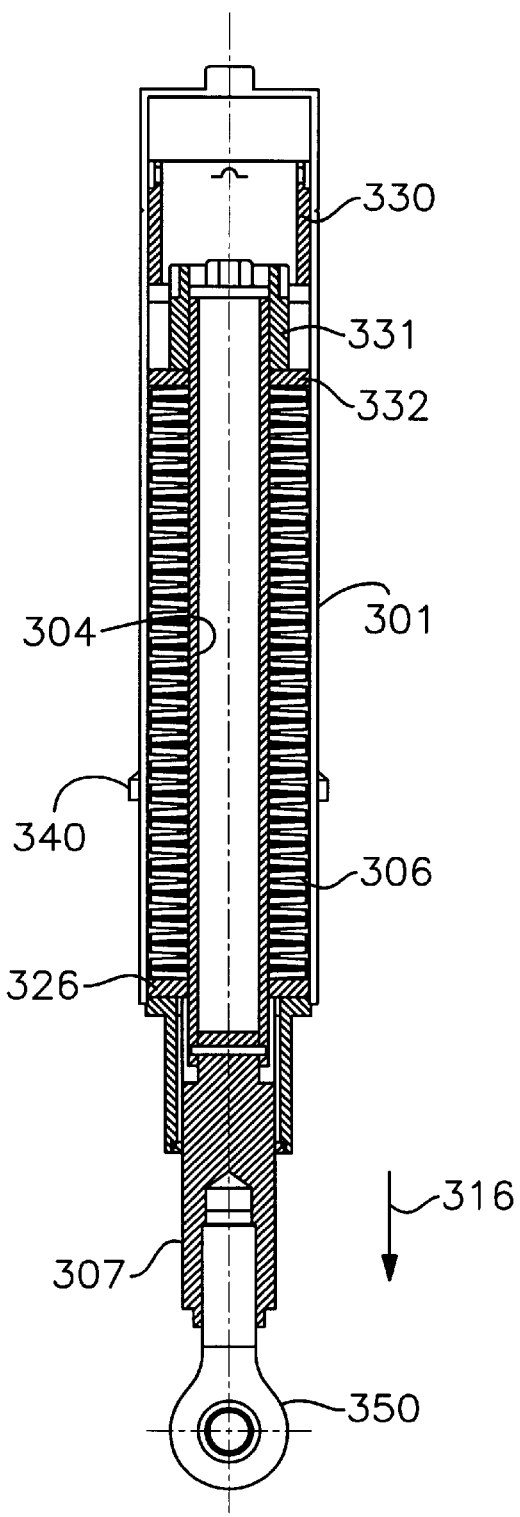
FIG. 18 is an elevational, cross sectional view of the spring dampening assembly operating to dampen downward movement by the trailer.
Figure 19:
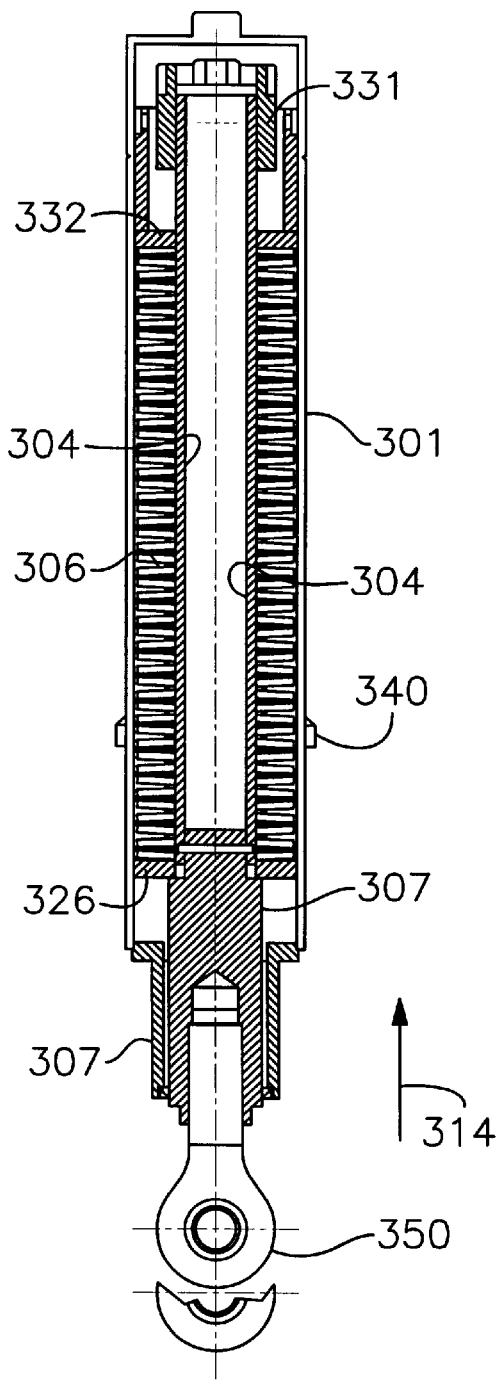
FIG. 19 is an elevated, cross sectional view of the spring dampening assembly operating to dampen upward movement by the trailer.

As shown in FIG. 16, a plate 303 having a central opening is fastened at the lower end of housing 301. A tubular, reduced diameter lower housing 305 is aligned with and depends from plate 303. An elongate inner tubular member 304 is mounted longitudinally within housing 301. The compression spring is defined by a stack of disc springs, typically comprising Belleville washers 306 that are mounted within housing 301 such that they are disposed annularly about inner tube 304. As will be known to those skilled in the art, Belleville washers include a generally dish or truncated conical shape wherein the inner diameter is displaced angularly from the outer diameter of the washer. The individual spring washers 308, best shown in FIG. 17, are stacked side by side in an alternating arrangement. In other words, each washer is oriented to face in a direction opposite to that of each adjacent washer. Additionally, smaller diameter annular spacers 310 and large diameter annular spacers 312 are disposed between alternating pairs of spring washers 308. In alternative embodiments, the spacers may be eliminated and a larger spring stack may be used. A lower thrust washer 326 sits on lower plate 303 and supports spring stack 306. A lower thrust unit 307 is slidably received through a bearing 309 mounted within lower housing portion 305. The upper end of lower thrust unit 307 engages thrust washer 326. A connector link 350 is attached by welding, threads or other appropriate means to lower thrust unit 307. The connector link includes an axial hole 352 that is employed to interconnect the spring assembly to the drawbar extension. Hole 352 is aligned with a corresponding hole formed through a rearward distal end of drawbar extension 48. These aligned holes are engaged by pin 302, FIG. 12, such that the drawbar extension is pivotally interconnected to spring assembly 300. This point of interconnection defines an x-axis coupling for the hitch, i.e. it defines the axis about which the tow vehicle and trailer rotate relative to one another when encountering a bump or dip in the road. A thrust unit extension 311 is threadably interconnected to the interior diameter of tube 304 at the lower end of the tube. A pin 313 further interconnects extension 311 and tube 304.

The upper end of housing 301 includes a cap 315 that is threadably attached or otherwise removably attached onto an annular retaining bolt 330. This bolt is also threadably connected to the inside diameter of housing 301. An upper thrust washer 332 is disposed about tube 304 and positioned between retaining bolt 330 and the upper end of spring stack 306. Both lower thrust washer 326 and upper thrust washer 332 include tapered faces that permit flexing of the lower and upper disc springs, respectively. An upper thrust nut 331 is threadably attached to the outside diameter of tube 304 at the upper end of the tube.

As best shown in FIG. 17, spacers 310 and 312 have tapered upper and lower surfaces that match the angle or taper of the respective adjoining disc springs 308. This permits the springs to exhibit an optimum degree of flex when compression is applied to the spring stack.

When spring assembly 300 is interconnected between trailer 12 and drawbar extension 48, the above described configuration enables the spring assembly to dampen both upward trailer movement in the direction of arrow 314 and downward trailer movement in the direction of arrow 316. During travel, when the trailer dips or is forced downwardly at its forward end, in the direction of arrow 316, the drawbar extension 266 pivots about pin 268 (FIG. 12) such that pin 302 pulls downwardly on connector link 350. Simultaneously, ball coupler 36, the trailer frame 30, housing 301 and spring stack 306 are hinging upwardly on trailer ball 42. Because connector link 350, thrust unit 307, center tube 304 and nut 331 are an interconnected assembly, nut 331 is pulled in the manner shown in FIG. 18 against upper thrust washer 332. This action further compresses spring stack 306, which has been precompressed by retaining bolt 330; thus the spring stack 306 resiliently cushions the downward movement of the trailer and restores the levelness of the tow car and trailer. The spring slack essentially dampens rotation of drawbar extension 266 about pivots 268 and 302. It should be noted that in alternative versions, other types of dual action spring and alternative dampening devices may be utilized.

Conversely, when the trailer bounces or is forced upwardly at trailer ball 42, arrow 314, the previously described motion is reversed. Connector link 350 and thrust unit 307 push upwardly against thrust washer 326 and precompressed spring stack 306 in the manner shown in FIG. 19. This dampens the upward movement of the trailer and restores the levelness of the coupled vehicles.

Accordingly, motion of the trailer in either direction is resiliently resisted by the spring stack 306. The precise number of disc springs is not a limitation of this invention, although in a preferred embodiment, 48 springs are employed. In such embodiments, twenty-three outer spacers 312 and twenty-four inner spacers 310 are utilized.

When spring assembly 300 is first installed, the spring stack 306 is preloaded to accommodate a predetermined tongue weight. This is accomplished using a hydraulic press. Stack 306 is compressed a desired amount as measured by a suitable gauge. At the desired level, retaining bolt 330 is screwed into housing 301 and against upper thrust washer 332. The size and strength of the disc springs which are used and/or the preloading may be varied as required by the particular tongue weight and trailer applications involved. It should be noted that in alternative versions, other types of spring means (i.e. helical or compression springs) may be used to dampen relative movement between the drawbar extension and the trailer.

To interconnect the drawbar assembly and hitchhead assembly, the trailer 12 is leveled and positioned so that the center of the hitch ball is approximately 19 inches above ground G. Drawbar assembly 14 is the then oriented and installed in the trailer receiver tube 22 as previously described. The height of horn 88 is adjusted so that recess 92 is approximately equal to upper hitchpin hole 36 of coupling component 30. Jack 56 raises or lowers the front end of the trailer so that there is a gap of about 0.75 inches between hole 36 and recess 92. see FIG. 12.

Figure 13:
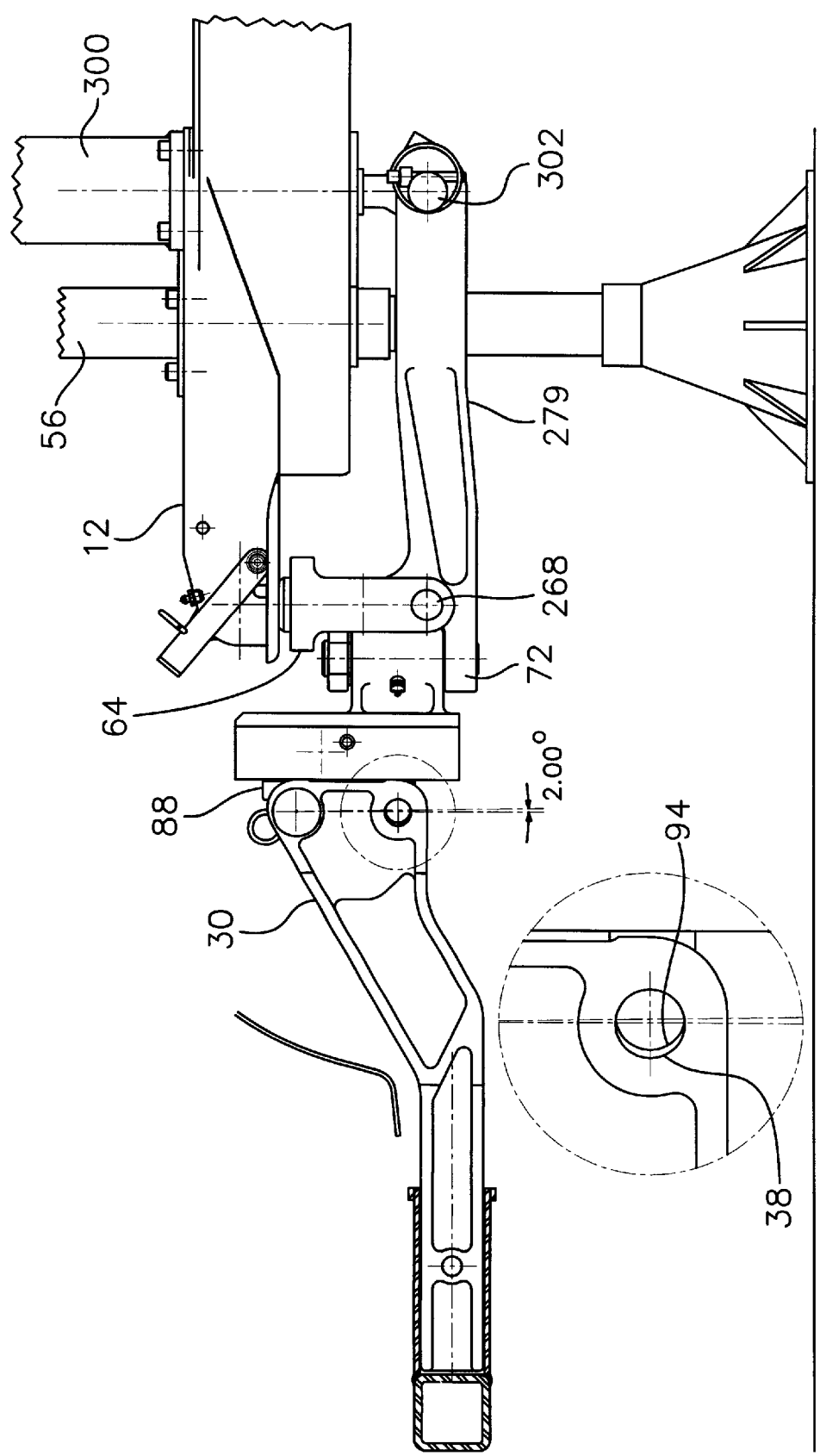
FIG. 13 is an elevational side view of the apparatus of FIG. 12 after the upper hitchpin carried by the first coupling component has dropped into the slot of the second coupling component and before the lower hitchpin holes are aligned.
Figure 14:
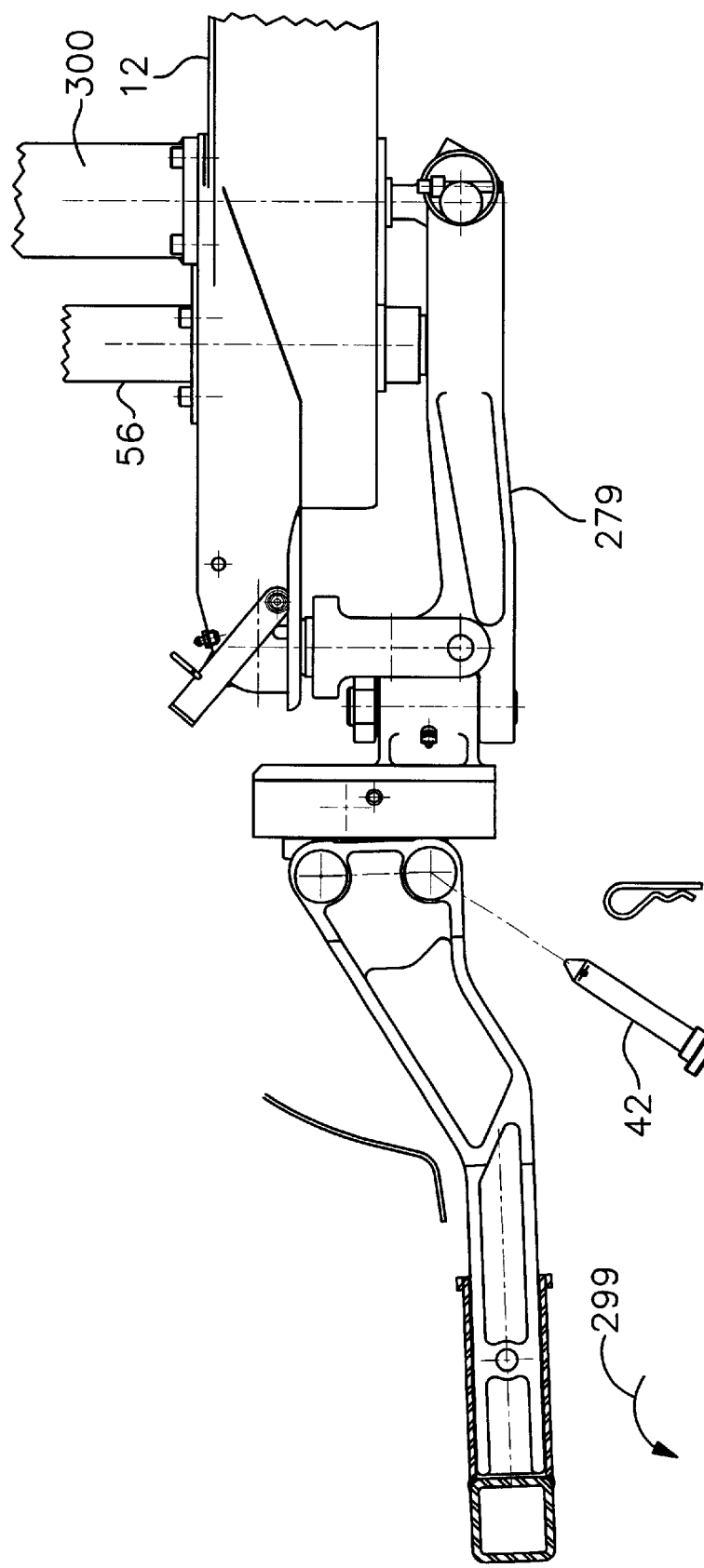
FIG. 14 is an elevational side view of the hitch apparatus of FIGS. 12 and 13 with the trailer frame being raised so that coupling may be completed.
Figure 15:
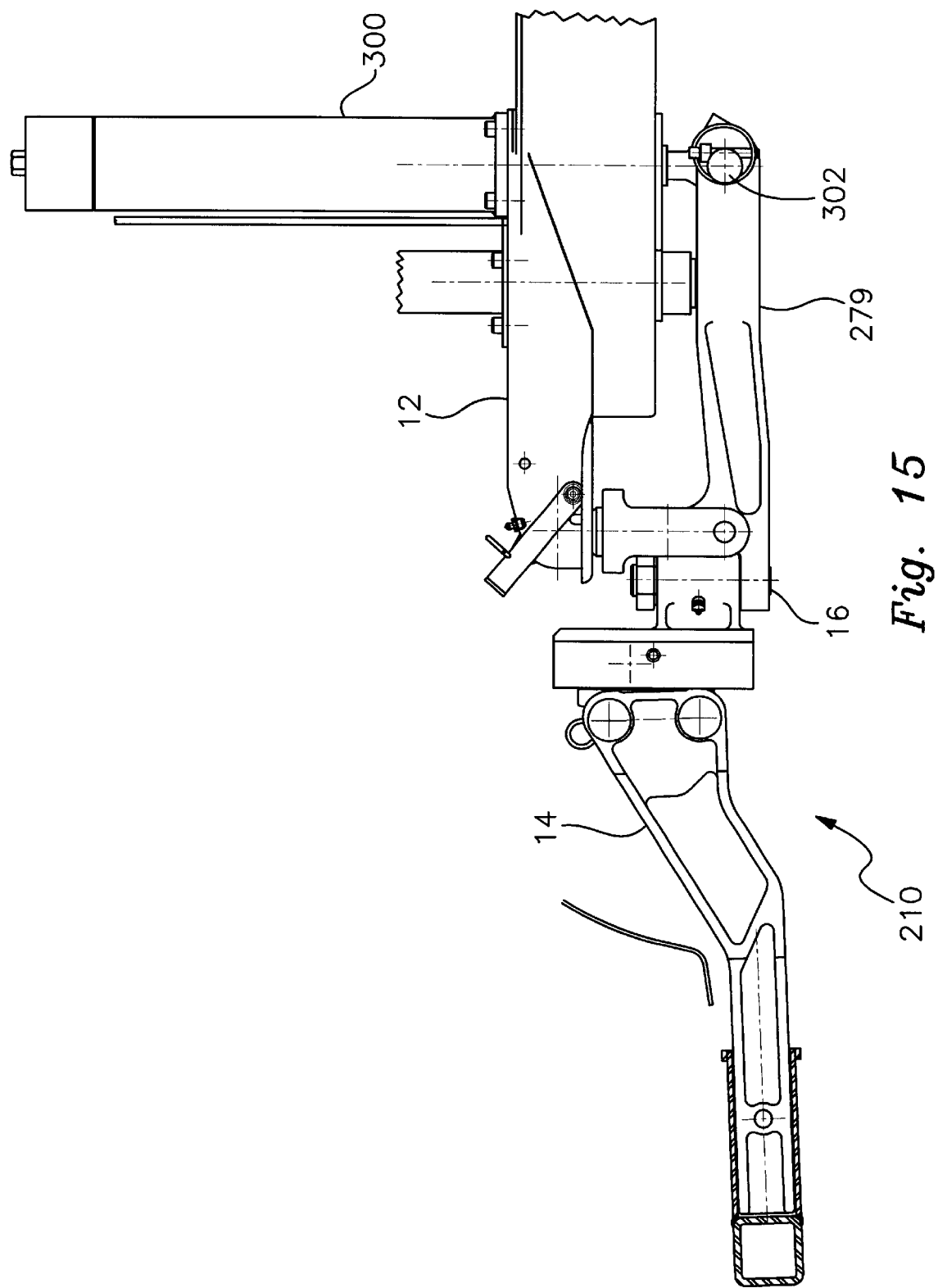
FIG. 15 is an elevational side view of the hitch apparatus of FIGS. 12 through 14 in a fully assembled condition.

After the above adjustments are made, the hitchpins are installed in holes 36 and the tow vehicle is driven rearwardly so that the upper hitch 40 pin engages ramp 96. The pin travels up the ramp and drops into slot 92. As shown in FIG. 13, lower hitchpin holes 38 of coupling component 30 and lower hole 94 of horn 88 are offset by an angle of approximately 2°. Jack 56 raises the front end of the trailer 12 until these holes align and a lower hitchpin 42, see FIG. 14, is inserted to fully couple the tow vehicle and the trailer. The 2° angle built into horn 88 causes the required torsion to be imparted to the tow vehicle as indicated by arrow 299. Jack 56 is then used to lower the front end of trailer 12 and coupling is complete. see FIG. 15.

As in the prior embodiment, the spring stack assembly serves to dampen hinging movement between the tow vehicle and the trailer. The forward end of the trailer overhangs the rearward end of the drawbar extension. As a result, the vehicles act essentially as a unified beam while traveling down the highway. A heavy tongue weight is not needed to offset a hinge or toggle effect. Instead, the unique form of interconnection between the trailer and the hitch, as well as the spring force of assembly 300 accomplishes this. It should be noted that the spring stack is preloaded in the manner described in earlier pending application.

The second embodiment of this invention operates analogously to the previously described embodiment. An improved stable ride is achieved. The tongue weight may be reduced to a level between ½ and 1½ times the average gross weight per foot of the trailer. This translates to a tongue weight of approximately 300 pounds or less. A force comparable to only half of this weight is transmitted to the tow vehicle. A significantly improved, stable ride is achieved.

Although both embodiments accomplish the benefits of this invention, the spring bar version will typically be less expensive to manufacture and install. It should also be noted that certain versions may employ both spring bars and a spring stack. In such a construction, the spring bars are pivotably connected to the lower distal ends of the spring stack. This embodiment is intended to accommodate trailers that inherently exhibit a large tongue weight. It is, therefore, well suited to be retrofit onto existing trailers wherein the front axle is located rearwardly of the tongue such that a heavy tongue weight is exhibited. In any event, significantly improved stability is achieved.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. A double-acting, reduced tongue weight trailer hitch for interconnecting a trailer to a tow vehicle, said hitch comprising:

a drawbar assembly including a bar selectively attachable to the tow vehicle and a first coupling component interconnected to said bar;

a hitchhead assembly that is suspendable from the trailer;

a drawbar extension connected to said hitchhead assembly privotally along a generally horizontal axis that is transverse to the direction of travel;

a second coupling component pivotally connected to said drawbar extension along a generally vertical axis, said first and second coupling components including complementary interengagable means for selectively coupling said first and second coupling components together and holding said drawbar assembly at a predetermined axial angle relative to the ground; and means for interconnecting a rearward portion of said drawbar extension to the trailer, said means for interconnecting including a pivot that has a substantially horizontal axis of rotation extending transversely to the direction of travel, at least one of said drawbar extension and said means for interconnecting including spring means for dampening movement of the trailer upwardly and downwardly relative to said drawbar extension and said pivot.

2. The apparatus of claim 1 in which said first coupling component is fixedly connected to said bar.

3. The apparatus of claim 1 in which said interengagable means restrict pivoting between said first and second coupling components.

4. The apparatus of claim 3 in which said interengagable means include first and second hitchpins removably carried by said first coupling component, said hitchpins being insertable in respective hitchpin holes in said first coupling component, and an upper slot and a lower hitchpin hole formed in said second coupling component and respectively receiving said hitchpins when said coupling components are interengaged.

5. The apparatus of claim 4 in which said second coupling component includes a horn having a ramp that is connected to said slot, said drawbar assembly being directed against said horn with said first hitchpin in one of said hitchpin holes in said first coupling component such that said first hitchpin rides up said ramp and enters said slot, the height of the trailer being adjusted to align the other said lower hitchpin hole in said first coupling component with said lower hitchpin hole in said second coupling component such that said hitchpin may be inserted through said aligned holes to fixedly interconnect said first and second coupling components.

6. The apparatus of claim 5 in which said second coupling component includes means for adjusting the height of said horn, said means for adjusting including a vertical channel element that is pivotally connected to said drawbar extension and slidably interengagable with said horn and means for interlocking said horn in said channel element at a selected height.

7. The apparatus of claim 5 in which said drawbar and said first coupling component have respective longitudinal axes that are disposed at an angle relative to one another, said drawbar assembly being inverted such that when said second hitchpin is inserted through an associated hitchpin hole in said first coupling component and said first hitchpin is removed from a second associated hitchpin hole in said first coupling component, said drawbar assembly may be directed against said second coupling component such that said second hitchpin rides up said ramp and is introduced into said slot and said other hitchpin hole in said first coupling component and said lower hitchpin hole in said second coupling component are alignable to receive said first hitchpin and fixedly interconnect said first and second coupling components.

8. The apparatus of claim 1 in which said drawbar extension includes a yoke that is pivotally interconnected to said second coupling component by a vertical pin.

9. The apparatus of claim 8 in which said hitchhead assembly includes a ball element that is releasably attached to a standard ball coupler mounted on a trailer, said yoke being mounted to said ball by a clevis that is suspended from said ball and horizontal pivot means that interconnect said yoke and said clevis.

10. The apparatus of claim 8 in which said drawbar extension includes an elongate bar attached to said yoke and extending rearwardly therefrom.

11. The apparatus of claim 10 in which said spring means include a stack of generally juxtaposed disk spring elements arranged in an alternating pattern.

12. The apparatus of claim 11 in which each disk spring has an annular shape and the spring means further include an elongate central element about which said annular disk springs are disposed in a housing that contains, said spring elements, which housing is mounted to the trailer frame.

13. The apparatus of claim 12 in which said spring means include annular spacer elements disposed about said central element and between each adjacent pair of spring elements.

14. The apparatus of claim 13 further including a connector link slidably mounted within said housing and resiliently engaging said spring elements, said connector link being pivotally interconnected to a distal portion of said drawbar extension bar.

15. The apparatus of claim 8 in which said drawbar extension includes a pair of longitudinally resilient spring bars that are releasably interconnected to said yoke, the distal end of each said spring bar being pivotally suspended from a support post that is attached to the trailer frame.

16. The apparatus of claim 15 in which said support post is mounted to the frame such that said post is pivotable about a first horizontal axis extending in the direction of travel and a second horizontal axis generally perpendicular to said first horizontal axis, said support post also being torsionally rotatable about a vertical axis, whereby movement of said support post allows said means for interconnecting to compensate for movement of the trailer hitch during operation of the tow vehicle and the trailer.

\* \* \* \* \*

UNITED STATES PATENT AND TRADEMARK OFFICE
CERTIFICATE OF CORRECTION

PATENT NO.     : 6,286,851 B1
DATED          : March 5, 2001
INVENTOR(S)    : Frank T. Sargent It is certified that error appears in the above-identified patent and that said Letters Patent is hereby corrected as shown below:

<u>Title page, Item [54] and Column 1, line 1,</u>
Change "DOUBLING" to -- DOUBLE --.

Signed and Sealed this

Twenty-fourth Day of December, 2002

JAMES E. ROGAN
*Director of the United States Patent and Trademark Office*